US008392880B2

(12) United States Patent
Ahadian et al.

(10) Patent No.: US 8,392,880 B2
(45) Date of Patent: Mar. 5, 2013

(54) RAPID APPLICATION DEVELOPMENT FOR DATABASE-AWARE APPLICATIONS

(75) Inventors: Azadeh Ahadian, San Jose, CA (US); Stephen Andrew Brodsky, Los Gatos, CA (US); Rebecca B. Nin, Morgan Hill, CA (US); Sonali Surange, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 11/741,644

(22) Filed: Apr. 27, 2007

(65) Prior Publication Data

US 2008/0270980 A1    Oct. 30, 2008

(51) Int. Cl.
*G06F 9/44* (2006.01)
(52) U.S. Cl. .................................................... 717/115
(58) Field of Classification Search .................. 717/101, 717/108, 177, 115; 719/219, 328; 707/999.002, 707/999.003, 999.004, 999.005, 2, 3, 102; 705/59; 700/266
See application file for complete search history.

(56) References Cited

U.S. PATENT DOCUMENTS

| 5,675,801 | A | 10/1997 | Lindsey |
| 5,701,400 | A | 12/1997 | Amado |
| 5,754,858 | A | 5/1998 | Broman et al. |
| 5,897,949 | A | 4/1999 | Luhmann et al. |
| 6,006,224 | A | 12/1999 | McComb et al. |
| 6,097,995 | A | 8/2000 | Tipton et al. |
| 6,240,417 | B1 | 5/2001 | Eastwick et al. |
| 6,298,342 | B1 | 10/2001 | Graefe et al. |
| 6,341,288 | B1 | 1/2002 | Yach et al. |
| 6,353,820 | B1 | 3/2002 | Edwards et al. |
| 6,446,256 | B1 | 9/2002 | Hyman et al. |
| 6,473,768 | B1 | 10/2002 | Srivastava et al. |
| 6,496,833 | B1 | 12/2002 | Goldberg et al. |
| 6,507,834 | B1 | 1/2003 | Kabra et al. |
| 6,591,272 | B1 | 7/2003 | Williams |
| 6,594,653 | B2 | 7/2003 | Colby et al. |
| 6,629,094 | B1 | 9/2003 | Colby et al. |
| 6,658,426 | B1 | 12/2003 | Poskanzer |
| 6,658,646 | B1 | 12/2003 | Hernandez, III |
| 6,799,184 | B2 | 9/2004 | Bhatt et al. |
| 6,799,718 | B2 | 10/2004 | Chan et al. |
| 7,047,518 | B2 * | 5/2006 | Little et al. ..................... 717/108 |

(Continued)

FOREIGN PATENT DOCUMENTS

| EP | 1251423 | 10/2002 |
| EP | 1251423 A2 | 10/2002 |

OTHER PUBLICATIONS

Robert A. Ballance et al., "The Pan Language-Based Editing System for Integrated Development Environments", SIGSOFT'90 Proceedings of the Fourth ACM SIGSOFT Symposium on Software Development Environments, Dec. 3-5, 1990, pp. 77-93, vol. 15 No. 6, Irvine, California.

(Continued)

*Primary Examiner* — Tuan A Vu
(74) *Attorney, Agent, or Firm* — Patterson & Sheridan, LLP

(57) ABSTRACT

Embodiments of the invention provide application development tools that allow developers to rapidly build database-aware applications and database unit tests. Embodiments of the invention support multiple scenarios for database-aware application development, including beginning from a database table and automatically creating application code to access the table, beginning from an existing database query, beginning from existing application code that accesses a database, and hybrids or variations of these approaches.

24 Claims, 8 Drawing Sheets

U.S. PATENT DOCUMENTS

| | | | |
|---|---|---|---|
| 7,054,924 B1 | 5/2006 | Harvey et al. | |
| 7,072,983 B1 | 7/2006 | Kanai et al. | |
| 7,076,772 B2 | 7/2006 | Zatloukal | |
| 7,086,009 B2 | 8/2006 | Resnick et al. | |
| 7,107,578 B1 | 9/2006 | Alpern | |
| 7,110,936 B2 | 9/2006 | Hiew et al. | |
| 7,137,100 B2 | 11/2006 | Iborra et al. | |
| 7,240,340 B2 | 7/2007 | Vaidyanathan et al. | |
| 7,350,192 B2 | 3/2008 | Seitz et al. | |
| 7,421,680 B2 | 9/2008 | DeLine et al. | |
| 7,516,128 B2 | 4/2009 | Colby et al. | |
| 7,539,973 B2 | 5/2009 | Hodge | |
| 7,650,592 B2 | 1/2010 | Eckels et al. | |
| 7,665,058 B2 | 2/2010 | Vogel et al. | |
| 7,681,176 B2 | 3/2010 | Wills et al. | |
| 7,685,194 B2 | 3/2010 | Kabra et al. | |
| 7,689,614 B2 | 3/2010 | de la Iglesia et al. | |
| 7,707,550 B2 | 4/2010 | Resnick et al. | |
| 7,725,460 B2 | 5/2010 | Seitz et al. | |
| 7,756,850 B2 | 7/2010 | Keith, Jr. | |
| 7,761,443 B2 | 7/2010 | Bhaghavan et al. | |
| 7,774,333 B2 | 8/2010 | Colledge et al. | |
| 7,788,085 B2 | 8/2010 | Brun et al. | |
| 7,792,836 B2 | 9/2010 | Taswell | |
| 7,792,851 B2 | 9/2010 | Berg et al. | |
| 7,797,303 B2 | 9/2010 | Roulland et al. | |
| 7,801,882 B2 | 9/2010 | Cunningham et al. | |
| 8,090,735 B2 | 1/2012 | Bireley et al. | |
| 8,095,823 B2 | 1/2012 | Griffith et al. | |
| 2002/0016953 A1 | 2/2002 | Sollich | |
| 2002/0059444 A1 | 5/2002 | Shinno | |
| 2002/0156772 A1* | 10/2002 | Chau et al. | 707/3 |
| 2002/0178434 A1 | 11/2002 | Fox et al. | |
| 2003/0004979 A1 | 1/2003 | Woodring | |
| 2003/0041052 A1* | 2/2003 | Gajda et al. | 707/3 |
| 2003/0074358 A1 | 4/2003 | Sarbaz et al. | |
| 2003/0172076 A1 | 9/2003 | Arnold et al. | |
| 2003/0200212 A1 | 10/2003 | Benson et al. | |
| 2003/0229885 A1 | 12/2003 | Gownder et al. | |
| 2004/0003371 A1* | 1/2004 | Coulthard et al. | 717/101 |
| 2004/0044687 A1 | 3/2004 | Vachuska et al. | |
| 2004/0064788 A1 | 4/2004 | Gownder et al. | |
| 2004/0078470 A1 | 4/2004 | Baumeister et al. | |
| 2004/0267690 A1 | 12/2004 | Bhogal et al. | |
| 2005/0027702 A1 | 2/2005 | Jensen et al. | |
| 2005/0091366 A1 | 4/2005 | Acharya | |
| 2005/0114771 A1 | 5/2005 | Piehler et al. | |
| 2005/0120014 A1 | 6/2005 | Deffler | |
| 2005/0160104 A1 | 7/2005 | Meera et al. | |
| 2005/0182758 A1 | 8/2005 | Seitz et al. | |
| 2005/0210374 A1 | 9/2005 | Lander | |
| 2005/0229154 A1 | 10/2005 | Hiew et al. | |
| 2005/0256852 A1* | 11/2005 | McNall et al. | 707/3 |
| 2005/0256907 A1 | 11/2005 | Novik et al. | |
| 2005/0262046 A1* | 11/2005 | Day et al. | 707/2 |
| 2005/0278270 A1 | 12/2005 | Carr et al. | |
| 2006/0020619 A1* | 1/2006 | Netz et al. | 707/102 |
| 2006/0020933 A1 | 1/2006 | Pasumansky et al. | |
| 2006/0041864 A1 | 2/2006 | Holloway et al. | |
| 2006/0075120 A1 | 4/2006 | Smit | |
| 2006/0085400 A1 | 4/2006 | Minore et al. | |
| 2006/0112067 A1 | 5/2006 | Morris | |
| 2006/0156286 A1 | 7/2006 | Morgan et al. | |
| 2006/0179027 A1 | 8/2006 | Bechtel et al. | |
| 2006/0236304 A1 | 10/2006 | Luo et al. | |
| 2006/0242077 A1* | 10/2006 | Dettinger et al. | 705/59 |
| 2006/0248045 A1 | 11/2006 | Toledano et al. | |
| 2006/0278270 A1 | 12/2006 | Jones | |
| 2007/0011651 A1 | 1/2007 | Wagner | |
| 2007/0044066 A1 | 2/2007 | Meijer et al. | |
| 2007/0050348 A1 | 3/2007 | Aharoni et al. | |
| 2008/0162445 A1 | 7/2008 | Ghazal | |
| 2008/0172360 A1 | 7/2008 | Lim et al. | |
| 2008/0189240 A1* | 8/2008 | Mullins et al. | 707/2 |
| 2008/0222129 A1 | 9/2008 | Komatsu et al. | |
| 2008/0270343 A1 | 10/2008 | Brodsky et al. | |
| 2008/0270983 A1 | 10/2008 | Ahadian et al. | |
| 2008/0270989 A1 | 10/2008 | Ahadian et al. | |
| 2008/0320013 A1 | 12/2008 | Bireley et al. | |
| 2008/0320441 A1 | 12/2008 | Ahadian et al. | |

OTHER PUBLICATIONS

Maarit Harsu et al., "A Language Implementation Framework in Java", Object-Oriented Technology, ECOOP'97 Workshop Reader, Lecture Notes in Computer Science, Jun. 9-13, 1997, pp. 141-144, vol. 1357, Jyvaskyla, Finland.

Azadeh Ahadian et al., "Extensible Rapid Application Development for Disparate Data Sources", U.S. Appl. No. 11/767,497, filed Jun. 23, 2007.

William R. Bireley et al., "Statement Generation Using Statement Patterns", U.S. Appl. No. 11/767,454, filed Jun. 22, 2007.

Charles Z. Mitchell, "Engineering VAX Ada for a Multi-Language Programming Environment", ACM SIGSOFT/SIGPLAN software engineering symposium on Practical software development environments, 1987, pp. 49-58.

Thomas C. Hartrum and Robert P. Graham, Jr., "The AFIT Wide Spectrum Object Modeling Environment: An Awsome Beginning", Proceedings of the IEEE 2000 National Aerospace and Electronics Conference, pp. 35-42, Oct. 10-12, 2000.

PCT International Search Report & Written Opinion for PCT/EP2008/053916, Dated Jan. 14, 2008.

B. Kurnalawan, Safari Books Online, "Struts Design and Programming: A Tutorial," Retrieved From http://proquest.safaribooksonline.com/0975212818?ocview=true.

DB Solo: The Ultimate Database Tool, 26 Pages, Retrieved From http://dbsolo.com/.

Azadeh Ahadian, "Understanding Purequery, Part 1: Purequery: IBM's New Paradigm for Writing Java Database Applications," (Aug. 16, 2007).

J. Liberty, "Safari Books Online," Visual C#2005: A Developer's Notebook, Retreived From http://proquest.safaribooksonline.com/059600799X?tocview=true.

"Eclipse Database Explorer—Database browser, SQL editor, ERD Specialized Oracle Connector, JDBC connection templates for all relational databases", Eclipse Database Explorer Plugin :: MyEclipse, retrieved Aug. 22, 2012, <http://www.myeclipseide.com/htmlpages-func-display-pid-16.html>.

Fitzpatrick, GP. et al.; "Source Code Critical Region Hyper-Data"; www.ip.com, 1993.

Abramson, D. et al. "A Debugging and Testing Tool for Supporting Software Evolution"; Automated Software Engineering, 1996 (vol. 3, pp. 369-390).

Brylow, D. et al.; "Deadline Analysis of Interrupt-driven Software"; Software Engineering Notes, 2003 (vol. 28, pp. 198-207).

International Search Report and Written Opinion for PCT Patent Application Serial No. PCT/EP2008/053831 dated Aug. 5, 2008.

Zhang et al., "Understanding Web Query Interfaces: Best-Effort Parsing with Hidden Syntax," SIGMOD '04 Proceedings of the 2004 ACM SIGMOD International Conference on Management of Data, Jun. 2004: pp. 107-118.

Cao et al., "Design and implementation for SQL parser based on ANTLR," 2010 2nd International Conference on Computer Engineering and Technology (ICCET), Apr. 2010, vol. 4: pp. 276-279.

Ghodke et al., "Fast Query for Large Treebanks," HLT '10 Human Language Technologies: the 2010 Annual Conference of the North American Chapter of the Association of Computational Linguistics, Jun. 2010: pp. 267-275.

Kats et al., "The Spoofax Language Workbench," Spash '10 Proceedings of the ACM International Conference Companion on Object Oriented Programming Systems Languages and Applications Companion, 2010: pp. 444-463.

Koch, "A Computational Semantic Approach Applied to Simple Database Queries," IEEE 2003 International Conference on Natural Language Processing and Knowledge Engineering, Oct. 2003, pp. 388-393.

Wu et al., "Integrating Diverse CIM Data Bases: The Role of Natural Language Interface," IEEE Transactions on Systems, Man, and Cybernetics, Nov./Dec. 1992, vol. 22(6): pp. 1331-1347.

\* cited by examiner

RAPID APPLICATION DEVELOPMENT FOR DATABASE-AWARE APPLICATIONS

BACKGROUND OF THE INVENTION

1. Field of the Invention

Embodiments of the invention are related to tools used to develop application software. More specifically, embodiments of the invention provide an intelligent integrated development environment (IDE) tool used for rapid application development of database-aware applications.

2. Description of the Related Art

Developing software applications is a complex task, and IDE tools are available to assist computer programmers with the development process. Currently, IDE tools are available to assist programmers developing applications in a variety of programming languages (e.g., Java®.net, C, C++, C#, etc.). These tools are typically configured with features such as auto-indenting, syntax highlighting, type checking, and a variety of other features that assist the development process. An IDE tool usually includes a text editor that visually displays errors as source code is typed, allowing a developer to correct errors before proceeding with the next line to code. Typically, IDE tools are optimized for different programming languages and errors are identified based on the programming language being used by the developer, often determined a suffix of a project file (e.g., .cpp for a c++ program or .java for a Java® program).

Although very useful, these IDE tools have a variety of limitations. For example, IDE tools provide little support for database statements embedded within the source code of an application. The database statements may retrieve data from, or update/insert data into, the database. In the program source code, database statements are usually specified as text strings in a database query language, such as SQL. The following source code fragment illustrates an embedded SQL query using the Java® programming language:

```
public interface get_data {
    // create connection to database
    @select sql= ("select column_A, column_B from database.table");
    // execute sql statement
    // process query results
}
```

Because the actual database query is enclosed within double-quotes, conventional IDE's treat the database statement as a text string, with no restrictions on string content.

Database-aware software applications are typically built using an application programming interface (API) that provides a means to use native query languages (e.g., SQL used to access relational data sources) using API calls included within program source code. For example, the well known JDBC (Java Database Connectivity) API is a specification for connecting programs written in the Java® programming language to a variety of commercially-available databases.

The JDBC API allows developers to embed database statements as text strings that are passed to a program that manages the database. Although effective, this approach may require substantial development time, as the developer is required to write all of the necessary source code to create a connection to a particular database, to pass the text of a database query to the database, to receive query results, and to store the results in an object of the application program; none of which is likely to be part of the core functions of an application. That is, the application program typically retrieves information from the database to perform some other logic or processing. For example, in the code fragment listed above, only the final step of "process query results" is likely to be related to the intended function of the application. The rest is simply overhead the developer must incur for the database-aware application to access an external database. Similarly, the developer must write all of the necessary source code to test each element of the application that accesses an external data source (i.e., each database-statement embedded within the source code of the application). Thus, the developer spends significant time performing tasks that, while necessary, are unrelated to writing the source code that performs the intended functions of an application being developed.

Moreover, the total development experience for a quality application grows exponentially difficult as complexity of the database accesses increase. Further, as the IDE environment does not provide database connectivity or programming assistance for the database statements embedded within the source code of an application program, developers are forced to juggle between various tools, spending substantial time to even get a database-aware application up and running before writing the core of the application, resulting in added cost to the application development process.

Accordingly, there remains a need for an IDE tool that provides rapid application development support for database-aware applications.

SUMMARY OF THE INVENTION

Embodiments of the invention provide an intelligent integrated development environment (IDE) tool for database-aware application development. For example, embodiments of the invention may be used to generate a software component configured to access a specified database using an appropriate API. The generated component may include a collection of database queries and the appropriate API calls to create, retrieve, update, and delete records from a given database. Once the component is generated, the developer may invoke methods provided by the component to perform database operations without having to write the component from scratch. By doing so, the developer may focus on the key task of application development, instead of writing the incidental (but necessary) code used to access the database. Additionally, the IDE tool may be configured to generate unit tests used to evaluate the functioning of the generated component.

One embodiment of the invention includes a method for generating source code for a database-aware software application. The method generally includes receiving, from a user interacting with an IDE tool, a selection of a database element and generating at least one database statements to access the database element. The method also includes encapsulating the at least one database statements within source code of a programming language in which the database-aware software application is being written, storing the source code within a project file associated with the database-aware software application, and displaying the source code in an editing pane of the IDE tool.

Another embodiment of the invention includes a computer program product comprising a computer useable storage medium having a computer readable program, where the computer readable program when executed on a computer causes the computer to perform an operation. The operation may generally include receiving, from a user interacting with an integrated development environment (IDE) tool, a selection of a database element and generating at least one database statements to access the database element. The operation may also include encapsulating the at least one database statements within source code of a programming language in which the database-aware software application is being written. The operation may also include storing the source code within a project file associated with the database-aware software application and displaying the source code in an editing pane of the IDE tool.

Another embodiment of the invention includes a system having a processor and a memory containing an IDE tool configured to generate source code for a database-aware software application. The operation may generally include receiving, from a user interacting with an integrated development environment (IDE) tool, a selection of a database element and generating at least one database statements to access the database element. The operation may also include encapsulating the at least one database statements within source code of a programming language, wherein the user is writing the database-aware software application in the programming language, storing the source code within a project file associated with the database-aware software application, and displaying the source code in an editing pane of the IDE tool.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
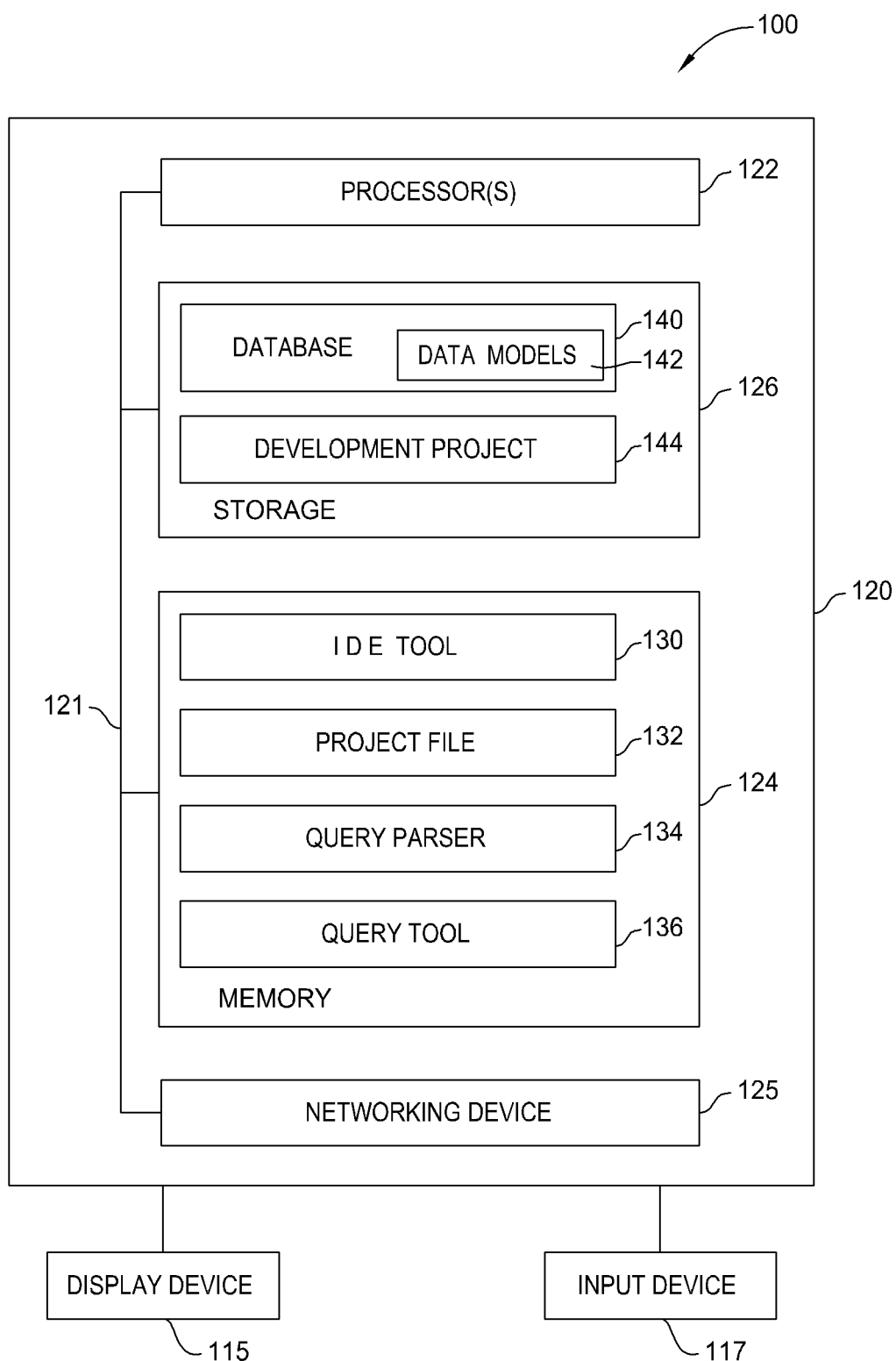
FIG. 1 illustrates an exemplary computing system, according to one embodiment of the invention.

Embodiments of the invention provide application development tools that allow developers to rapidly build database-aware applications and database unit tests. Embodiments of the invention support multiple scenarios for database-aware application development, including beginning from a database table and automatically creating application code to access the table, beginning from an existing database query, beginning from existing application code that accesses a database, and hybrids or variations of these approaches.

Advantageously, embodiments of the invention provide automatic code generation, query generation for multiple languages, and unit test automation, leaving the developer to spend more time focused on designing and writing code to perform the intended functions of a database-aware application. Further, the developer may make frequent use of unit-test programs executed during application development, providing seamless integration of database connectivity with the regular development process. Thus, embodiments of the invention may significantly reduce application development and testing overhead related cost.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drives) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Additionally, an embodiment of the invention is described herein relative to an IDE tool used to develop a database-aware software application using the Java® programming language that includes embedded SQL statements. One of ordinary skill in the art will readily recognize, however, that embodiments of the invention may be adapted for use with a wide variety of programming languages used to develop database-aware applications. Similarly, embodiments of the invention may be adapted for use with other database query languages.

FIG. 1 is a block diagram that illustrates an example view of a computing environment 100, according to one embodiment of the invention. As shown, computing environment 100 includes computer system 120. Computer system 120 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 120 is simplified to highlight aspects of the present invention and that computing systems and data communication networks typically include a variety of additional elements not shown in FIG. 1.

As shown, computer system 120 includes a processor (or processors) 122, a storage device 124, a networking device 125, and a memory 126, all connected by a bus 121. CPU 122 is a programmable logic device that executes user applications (e.g., an IDE tool 130). Computer system 120 may be connected to a display device 115 and at least one input devices 117. Typically, user input devices 117 include a mouse pointing device and a keyboard, and display device 115 is a CRT monitor or LCD display. The processing activity and hardware resources on computer system 120 may be managed by an operating system (not shown). Well known examples of operating systems include the Windows® operating system, distributions of the Linux® operating system, and IBM's i5/OS® operating system, among others. (Linux is a trademark of Linus Torvalds in the U.S., other countries, or both). Network device 125 may connect computer system 120 to any kind of data communications network, including both wired and wireless networks.

Storage device 126 stores application programs and data for use by computer system 120. Typical storage devices include hard-disk drives, flash memory devices, optical media, network and virtual storage devices, and the like. As shown, storage device 126 contains a database 140 and a development project 144. Database 140 may store a collection of data records organized according to a data model 142. For example, data model 142 may provide a relational schema of tables, columns, and keys for organizing data records stored in database 140 and accessed using SQL database statements. Development project 144 represents a collection of information used to build a software application. For example, development project 144 may include source code files, scripts, etc., along with resources such as fonts, images, build-instructions, and project documentation, etc.

As shown, memory 124 stores a number of software applications, including an IDE tool 130, a query parser 134, and a query tool 136. Also, memory 124 includes a project file 132. Query parser 134 may be a software application configured to evaluate a database statement for both syntactic and semantic correctness. And query tool 136 may be a software application configured to execute a valid database statement (e.g., an SQL query). In one embodiment, IDE tool 130 may be configured to pass database statements to query tool 136 for execution.

IDE tool 130 is a software application used to develop other software applications. Typically, IDE tool 130 combines an editor, a compiler and other useful tools in the same software package. In one embodiment, IDE tool 130 is configured to generate elements of source code for a database-aware software application. For example, in one embodiment, IDE tool 130 may generate the appropriate source code to connect to a database associated with development project 144 along with objects that encapsulate database statements used to create new records and to retrieve, update, and delete existing records from database 140. Further, IDE tool 130 may generate all of the necessary source code allowing the developer to invoke these operations from within application source code (e.g., a collection of Java® methods exposed through an interface provided by a Java® bean object).

Additionally, IDE tool 130 may be configured to generate and execute unit tests to test the functionality of the database-aware application as it is being developed. Thus, unlike conventional development methodologies where the database statements are only tested when the application is built and executed, embodiments of the present invention allow database testing to become an integrated part of the database software development process.

In another embodiment, IDE tool 130 may also be configured to generate database-aware application code around an existing query. Building an application for a known, often highly-customized and complex database query is a common requirement. The query itself can be a combination of various languages (e.g., SQL, xquery, java host variables). Writing a database-aware application around such a query requires the developer to have full knowledge of each language and the metadata and/or data model associated with the syntax of each database language (e.g., SQL, xquery, java) and the parser technologies. IDE tool 130 hides this complexity from the developer by generating an application around such an existing query.

Project file 132 represents a file included in development project 144 that is being edited by a developer using IDE tool 130, e.g., a source code file of a database aware software application. IDE tool 130 may display the text of the source code to the developer on display device 115 and provide an interface that allows the user to edit project file 132. In one embodiment, database-aware application source code generated by IDE tool 130 may be stored in project file 132.

Figure 5:
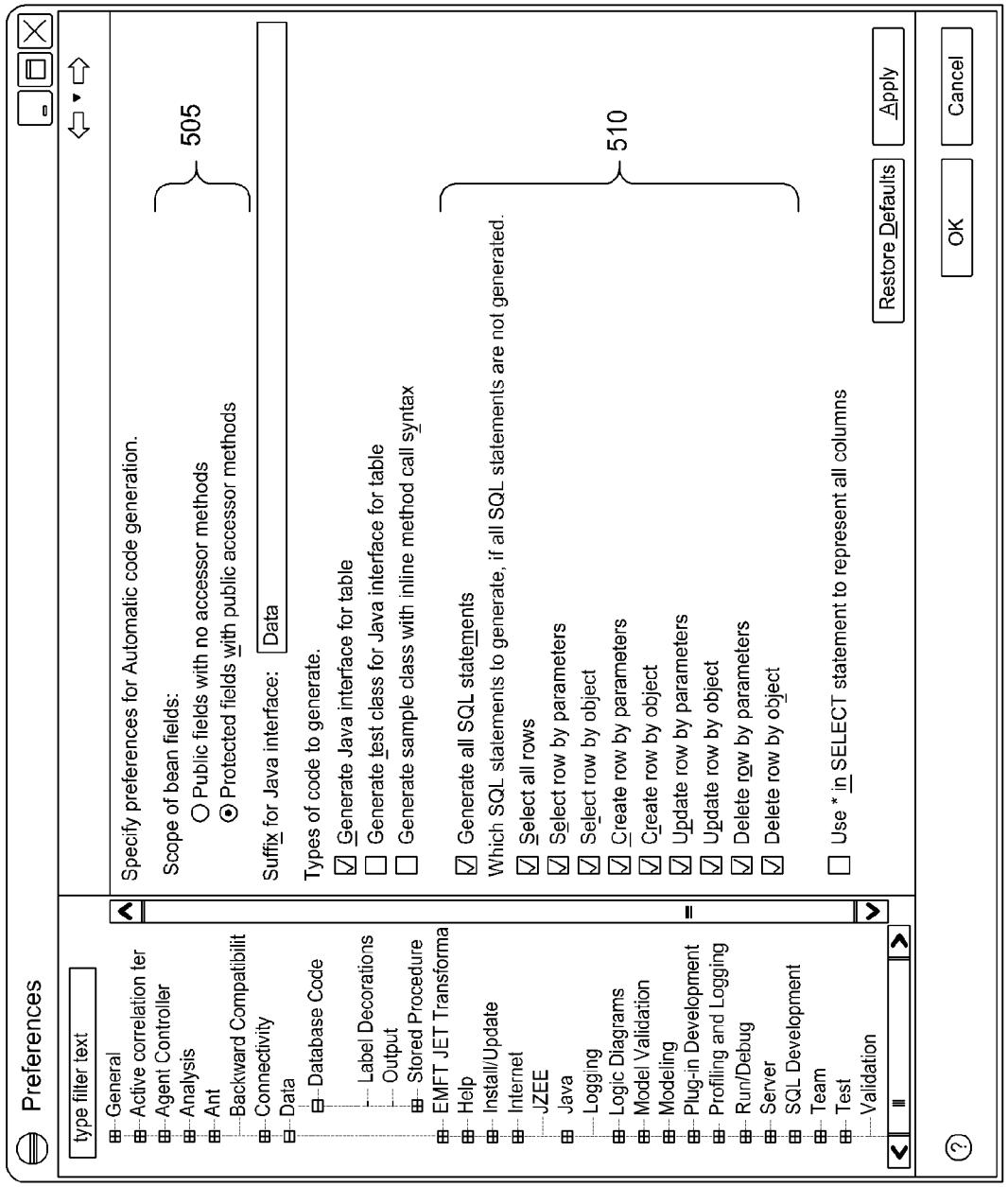
FIG. 5 illustrates a screenshot of an exemplary IDE tool configured to allow a developer to specify a variety of options for generating source code for a database-aware application, according to one embodiment of the invention.
Figure 6:
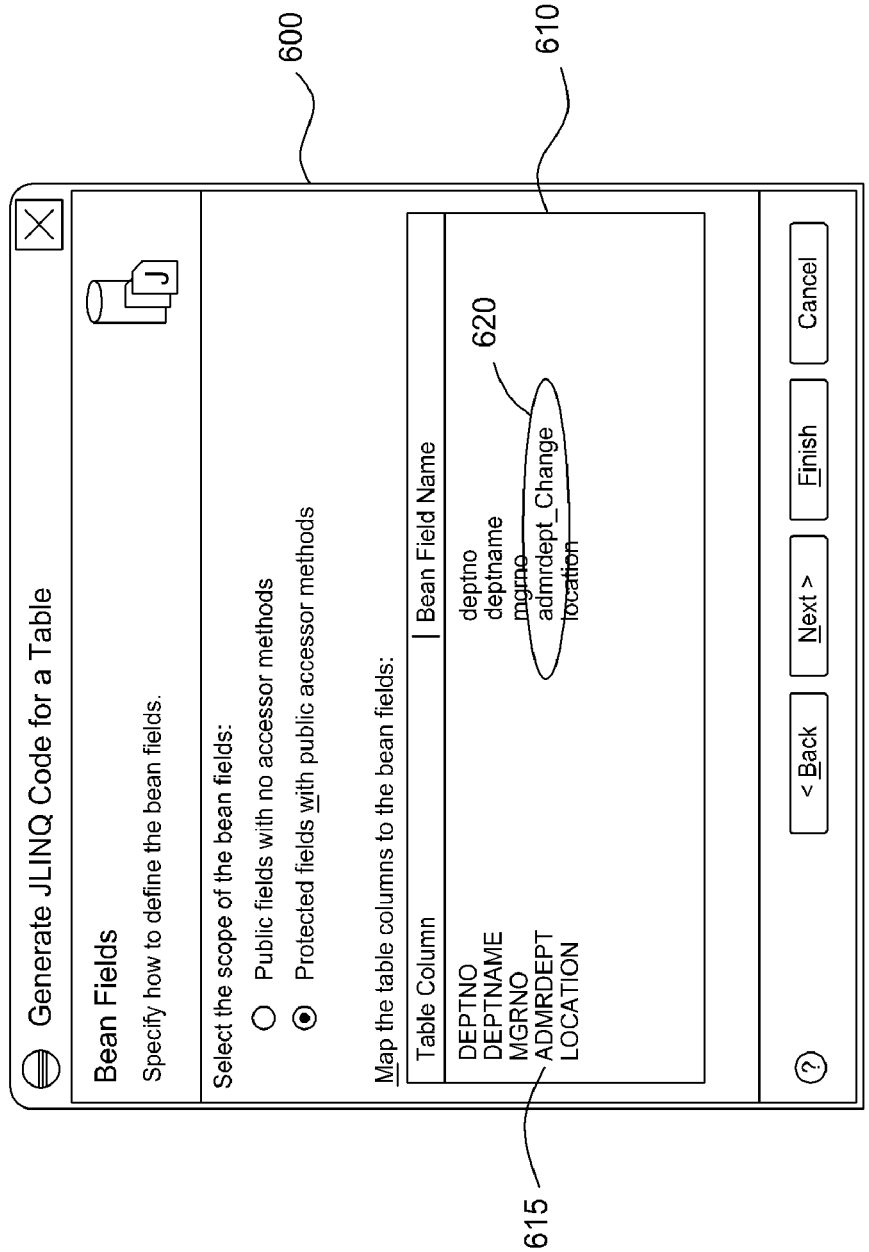
FIG. 6 illustrates a screenshot of an exemplary IDE tool configured to allow a developer to specify mappings between elements of a database and variables defined within the source code of a database-aware application, according to one embodiment of the invention.
Figure 7:
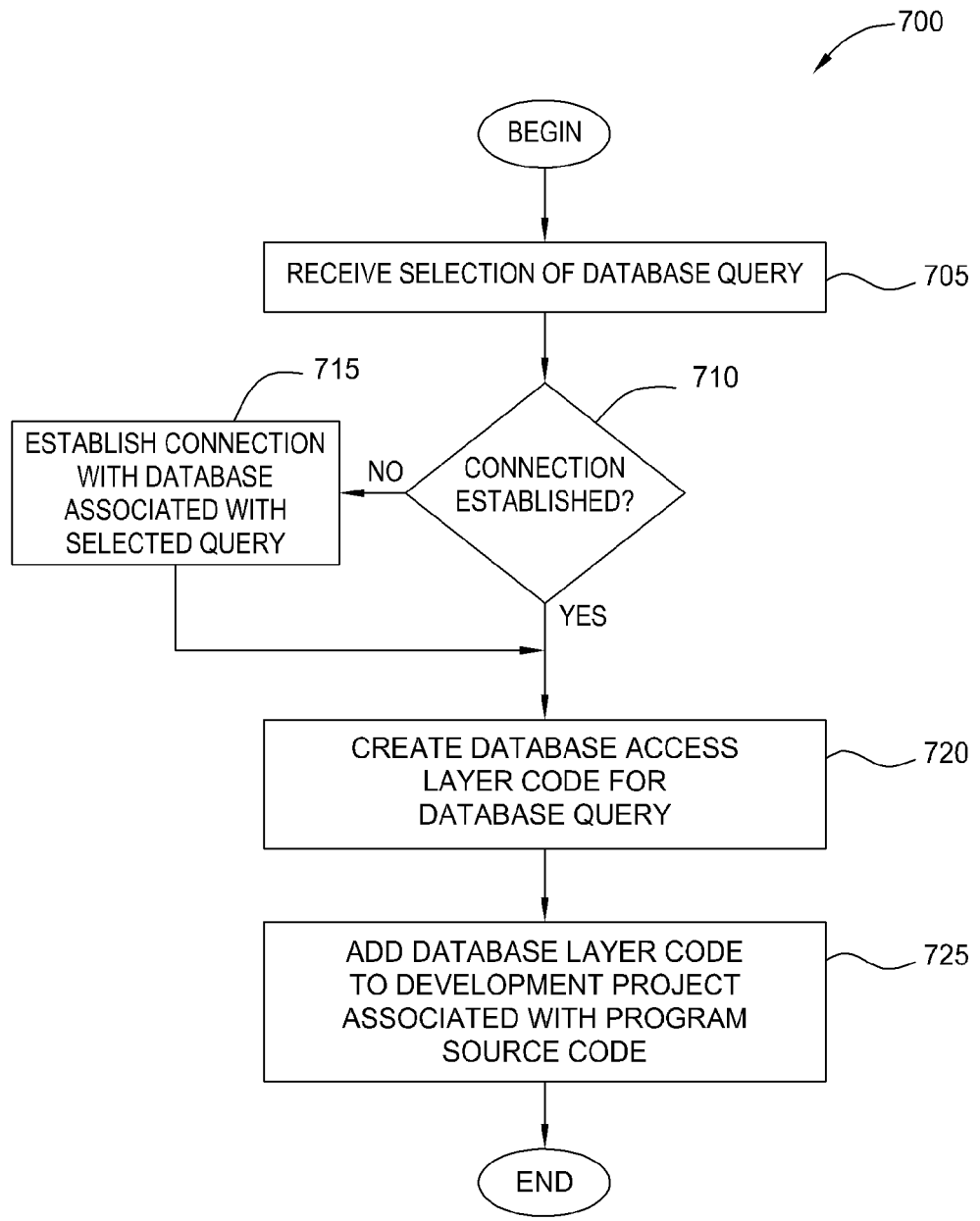
FIG. 7 illustrates a method performed by an IDE tool configured to provide rapid application development for database-aware applications, according to one embodiment of the invention.
Figure 8:
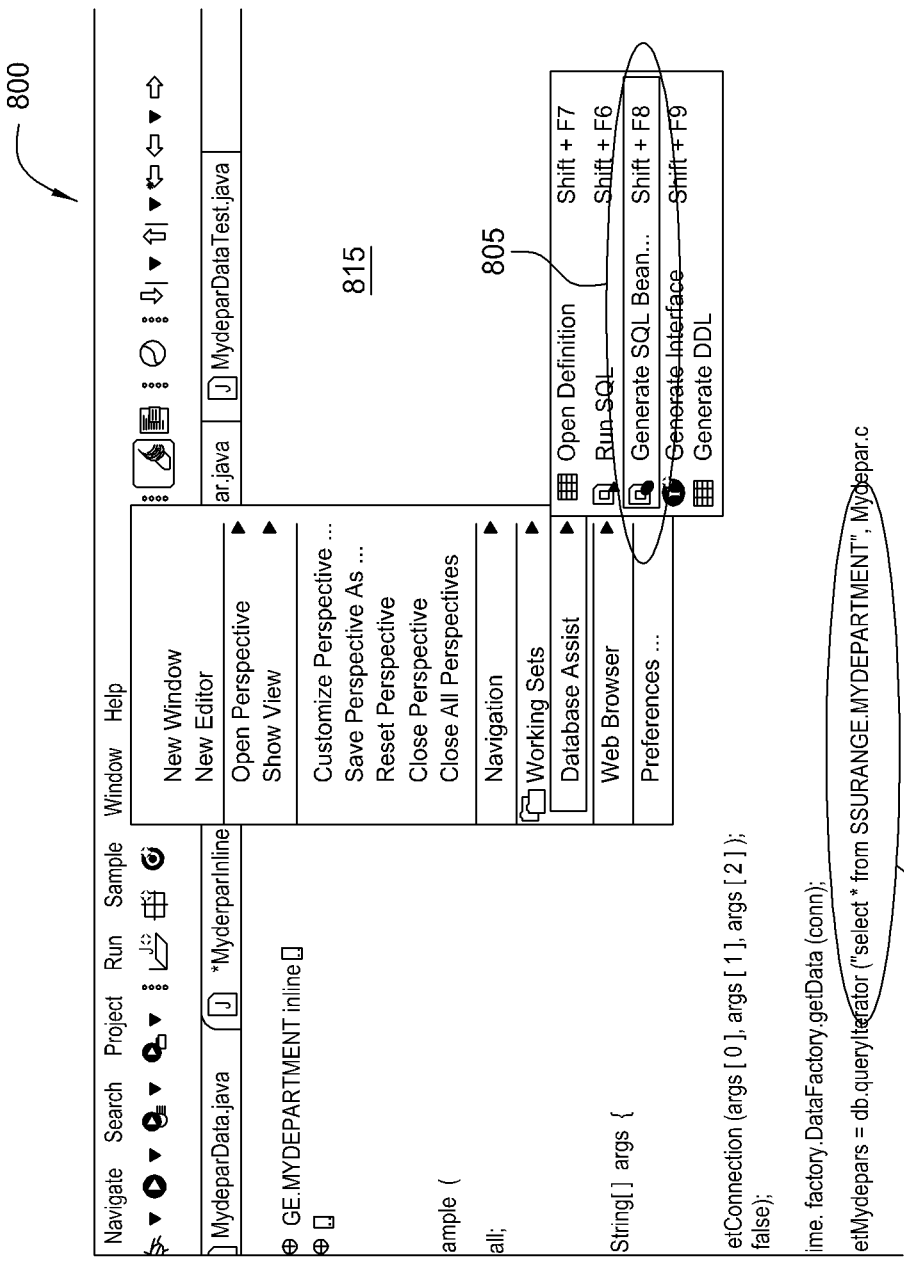
FIG. 8 illustrates a screenshot from an exemplary IDE tool configured to generate source code for a database-aware application, according to one embodiment of the invention.

FIGS. 2-6 illustrate an embodiment of IDE tool 130 configured to generate database access code for an existing database. FIGS. 7-8 illustrate an embodiment of IDE tool 130 configured to generate database access code around a pre-existing database query.

Figure 2:
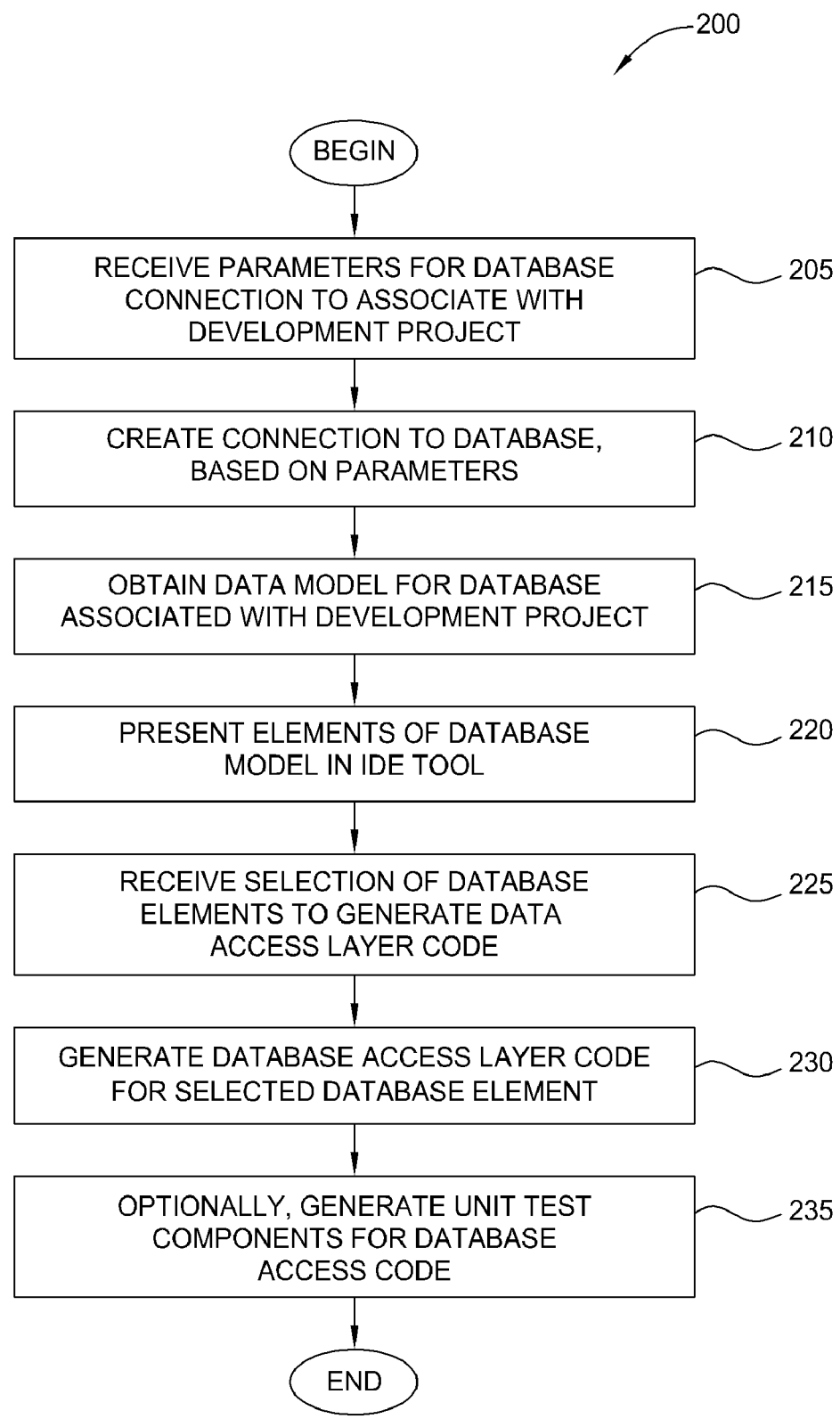
FIG. 2 illustrates a method performed by an IDE tool configured to provide rapid application development for database-aware applications, according to one embodiment of the invention.
Figure 3:
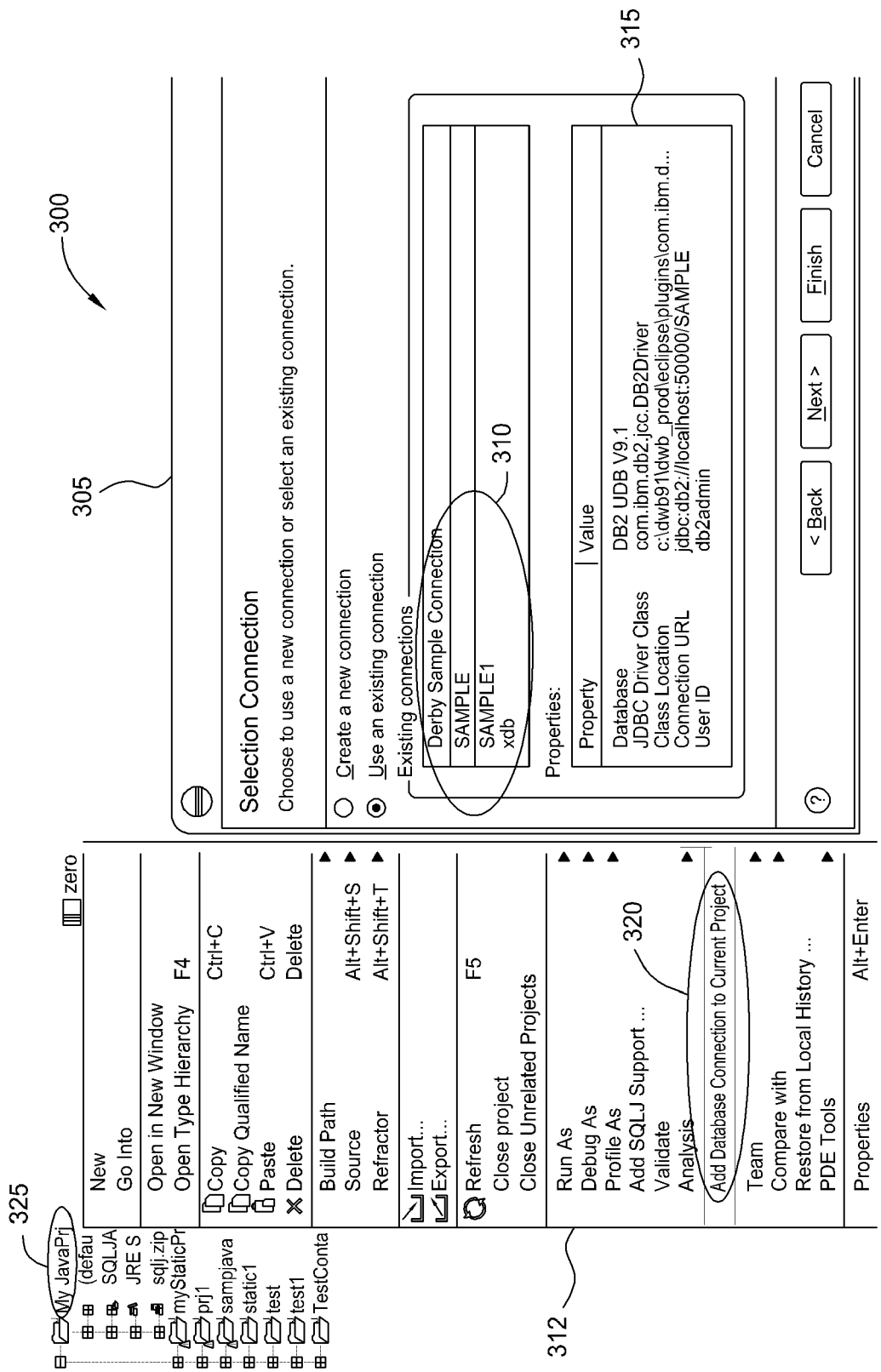
FIG. 3 illustrates screenshots of an exemplary IDE tool configured to provide database connectivity from within a development project, according to one embodiment of the invention.

FIG. 2 illustrates a method 200 that may be performed by IDE tool 130 to provide rapid application development for database-aware applications, according to one embodiment of the invention. As shown, the method begins at step 205 where IDE tool 130 receives parameters related to an existing database to associate with a development project (e.g., development project 140). For example, FIG. 3 illustrates screenshots of an exemplary IDE tool configured to provide database connectivity from within a development project. In the example of FIG. 3, a developer has created a development project 325 with the name "MyJavaPrj." When a developer right-clicks on this project, IDE tool 130 may respond by displaying a menu like menu 312 Illustratively, menu 213 includes a menu item 320 labeled "add database connection to current project." By selecting menu item 320, a user may cause IDE tool 130 to display a dialog box like dialog box 305. Dialog box 305 includes a list of available connections 310 and a table 315 a set of properties associated with a currently-highlighted database connection.

Once the developer specifies the properties of a desired database connection, then at step 210, IDE tool 130 may establish a connection with the database specified at step 205. Additionally, IDE tool 130 may associate the parameters of the database connection with development project 144. IDE tool 130 provides ease of use so that information needed for executing such a test program such as a connection URL, user name and/or password does not need to be provided manually by the developer. Thus, the developer may save the development project and resume it at a later time without also having to recreate the database connection for a given project.

At step 215, IDE tool 130 may obtain a data model (e.g., data model 142) for the database associated with the database project. For example, a data model for a relational database includes a collection of tables, columns names, column data types, keys (i.e., table-to-table relationships) etc. Additionally, in one embodiment, the IDE tool need not maintain an active connection to a database. Instead, IDE tool 130 may cache the data model obtained at step 215, and update it either periodically or as specified by the developer. Thus, a developer may work offline or disconnected when building the database-aware application. This may be useful where the database-aware application being developed is associated with a "live" or "production" database and maintaining an open connection would be disruptive of the "production" use of the database.

At step 220, once the data model for a given database is obtained, IDE tool 130 may be configured to display elements of the data model as part of the development project. For example, IDE tool 130 may present a tree-like hierarchy beginning from a database name which when expanded lists each table present in the data model. In turn, each table may be expanded to show each of the columns present in a given table. Thus, the database connection may be used to integrate components of database structure as part of a given development project.

Figure 4:
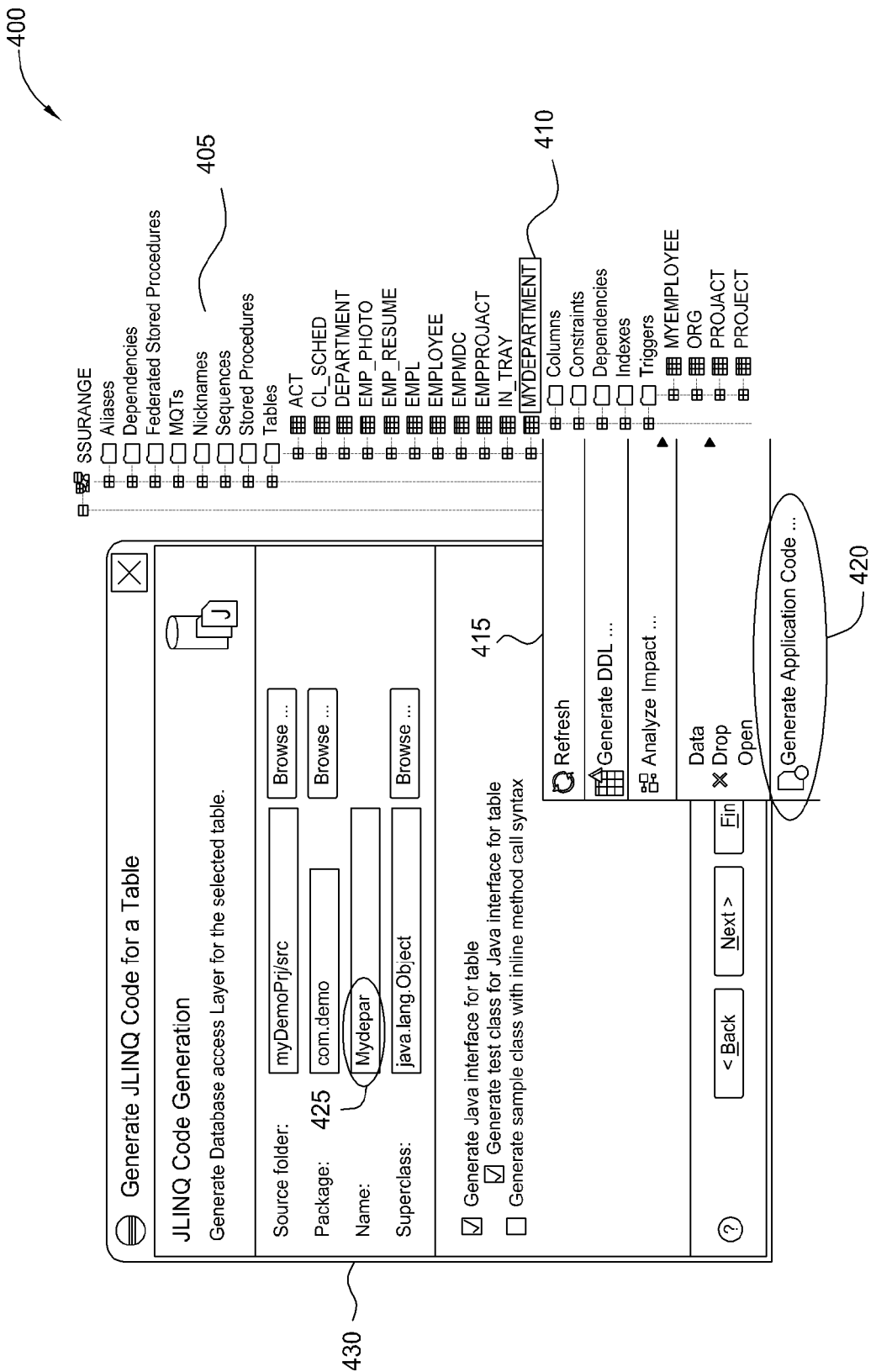
FIG. 4 illustrates a screenshot of an exemplary IDE tool configured to generate source code for a database-aware application, according to one embodiment of the invention.

Further, as described in greater detail below, IDE tool 130 may be configured to generate application source code to access data records in the database. Returning to method 200 of FIG. 2, at step 225, the IDE tool 130 may receive a selection of a database element. In response, IDE tool 130 may generate application code to connect with and access the selected database element. For example, IDE tool may generate a set of database statements encapsulated within API calls to access records from a relational table. FIG. 4 illustrates a screenshot 400 of an exemplary IDE tool configured to generate source code for a database-aware application, according to one embodiment of the invention. Illustratively, screenshot 400 shows a tree hierarchy 405 that includes elements of a database associated with a development project. Specifically, a database named "SSURANGE" includes a number of tables. Tree hierarchy 405 includes a database table 410 named "MYDEPARTMENT." Further, information related to the columns, constraints, dependencies, indexes, and triggers is available for database table 410 in tree hierarchy 405.

In this example, screenshot 400 shows the interface of IDE tool 130 being used to select a database table and have IDE tool 130 generate application source code used to access the selected table. Specifically, a user has right-clicked on table 410, and in response, IDE tool 130 has displayed menu 415. By selecting menu item 420, a user may cause IDE tool 130 to display a dialog box like dialog box 430. In this example, dialog box 430 allows a developer to specify a name 425 for a project file to be created along with other information related to the application source code to be generated. Additionally, in one embodiment, a user may specify additional options or parameters for the application code to be generated. For example, FIG. 5 illustrates a screenshot 500 of an exemplary IDE tool configured allow a developer to specify a variety of options for generating source code for a database-aware application. Illustratively, this example is based on an IDE tool configured to generate a Java® bean object that accesses a relational database table. Of course, embodiments of the invention may be adapted for use with other programming languages and types of database.

As shown, a developer has used a radio button 505 to specify whether the fields of the Java® bean to be generated are "public" or "protected" and has used checkboxes 510 to specify which SQL queries IDE tool 130 should generate and encapsulate within the Java® bean to be generated. In this case, the developer has selected a global "generate all SQL statements" option. Thus, queries are created to create, retrieve, update, and delete records from the database. Further, queries for each of these operations are created at the table, parameter, and record level of the underlying database.

The example shown in FIGS. 4 and 5 illustrate a developer selecting a single database table. However, when more than one table is selected, IDE tool 130 may be configured to determine relationships that may exist and propose join statements used to combine information from (or store information in) multiple database tables. IDE tool 130 may use the SQL model metadata (i.e., data model 142 of FIG. 1) for this process. In one embodiment, default database queries and methods are provided as suggestions and the developer may chose to generate one of all of the statements and integrated query editing tools, allowing productive customization of these default queries.

In one embodiment, IDE tool 130 may allow developer customizations to improve code readability and/or compliance to coding standards where applicable by providing developers with the ability to specify object names (a label used within application source code) from schema names (a label used within a relational database). A mapping may be generated to link two related labels. For example, FIG. 6 illustrates a screenshot 600 of an exemplary IDE tool configured to allow a developer to specify mappings between elements of a database and program variables defined within the source code of a database-aware application, according to one embodiment of the invention. As shown, screenshot 600 includes a table 610 listing mapping between a column in a database table and an object filed name within a Java® bean object. For example, the column 615 named "ADMRDEPT"

maps to the bean field name 620 of "admrdept_change." In one embodiment, IDE tool may use the Java® programming language construct of an annotation to manage these links.

Returning to the method 200 of FIG. 2, at step 230, once the developer has specified all of the desired parameters and options, IDE tool 130 may be configured to generate application source code to access the elements of the database specified at steps 205 and 225. For example, IDE tool 130 may generate source code to create a database connection, generate host variables mapping to columns and fields of the database, and methods that pass queries to the database over the database connection. In one embodiment, IDE tool 130 may be configured to generate source code based on a particular API, e.g., the JDBC API which allows an application written in the Java® programming language to establish a connection with a database and to transmit and receive query results from the database.

Optionally, at step 235, IDE tool 130 may also generate unit test code that the developer may use to evaluate the application code generated at step 230. That is, developers can chose to generate sample programs and unit tests that exercise all or some parts of the code generated at step 230. Thus, developers do not have to write a single line of code to effectively test portions of a database aware application, and can instead test database access by an application with one click. The IDE tool 130 may generate unit tests to test each of the create, retrieve, update, and delete methods generated by the IDE tool 130. In one embodiment, the sample unit test program achieves this by executing first test query to retrieve all rows of table from the database. A second test query is then executed to retrieve first row in order to test a retrieve by parameter/object query. The unit test then updates the row with sample test values, deletes it and inserts it back, into the database which tests the application source code generated to perform the update, delete and create operations respectively in the application. Thus, the status of the underlying database remains intact at the end of a successful test execution. Further, in one embodiment, a rollback is called at the end in case of failure.

In one embodiment, IDE tool 130 provides ease of use so that information needed to execute such a test program (e.g., connection URL, user name, password) need not be provided manually by the user. IDE tool 130 may use this information from the connection associated with the project to automatically execute the unit test program. Thus the developer is provided with a one-click mechanism to run the sample program. Further, the unit test program may be integrated with a project save mechanism such that when the unit test is regenerated or manually changed, the save action compiles and runs it. IDE tool 130 may also provide execution time and other statistical information related to program and/or database query performance.

As stated, building a database-aware application for a known highly customized and complex query is a common requirement. Accordingly, in one embodiment, IDE tool 130 may be configured to use an existing database query and generate application source code around such an existing query.

FIG. 7 illustrates a method performed by an IDE tool configured to provide rapid application development beginning from an existing database query, according to one embodiment of the invention. As shown, method 700 beings at step 705 where IDE tool 130 is passed a database query. The query may be embedded within the source code of an application program being edited using IDE tool 130, or may also provided to IDE tool 130 as part of a text file, script, URL, etc. At step 710, the IDE tool may determine whether a connection to a database referenced by the query has been established.

As described above, the developer may have associated a database with a given development project. If not, at step 715 the IDE tool may create a connection with the database referenced by the query received at step 705. For example, FIG. 8 illustrates a screenshot 800 from an exemplary IDE tool configured to generate source code for a database-aware application, according to one embodiment of the invention. As shown, screenshot 800 includes an editing pane 815 of IDE tool 130 displaying a portion of source code from a database-aware application. In this example, the source code included a text-string 810 representing a database query. Specifically, the SQL query "select*from SSURANGE.MYDEPARTMENT." This query retrieves all records from a "MYDEPARTMENT" table of a database named "SSURANGE." Also as shown, the user has selected a "Database Assist" item from a menu provided by IDE tool 130. Illustratively, the user has selected to create a Java® bean around query represented by text-string 810. Accordingly at step 710 of method 700, IDE tool 130 may determine whether a connection with the "SSURANGE" database has been established as part of a currently active development project. If not, then at step 715 IDE tool 130 may establish a connection with this database.

At step 720, the IDE tool may generate database access code for the database elements referenced in the query selection received at step 705. As described above, this may include generating application source code and database queries to create, retrieve, update, and delete records from an underlying database. At step 725, the code generated at step 720 may be added to the currently active development project. For example, as shown in FIG. 8, menu item 805 is selected and, in response, IDE tool 130 may generate a Java® bean encapsulating both query 810, as well as other queries (e.g., a create, update, and delete query) of the database element referenced in query 810 (i.e., the "MYDEPARTMENT" table of the "SSURANGE" database).

Advantageously, as described herein, embodiments of the invention provide an integrated development environment (IDE) tool used for rapid application development of database-aware applications. Currently, to create database-aware applications, developers are typically forced to write all of the database access layer code from scratch. That is, developers have to write application source code to create a connection to a given database, compose individual queries, and encapsulate the queries within API calls for a given programming language. Further, because IDE tools lack database integration, developers have to switch around using multiple, independent tools. Embodiments of the invention address this by integrating database connectivity within an IDE. Thus, a developer may select an existing database element (e.g., a table) and the IDE tool may generate all of the application source code, API calls and database queries needed for a functioning database-aware application. Alternatively, a developer may generate application source code from an existing database query, either part of application source code or otherwise. Therefore, development cycle time may be significantly reduced as the developer. In addition to these scenarios, one of skill in the art will readily recognize that the rapid application development tool described herein may be tailored to accommodate a variety of other scenarios. Thus, embodiments of the invention provide developers with the ability to easily generate source code for a database-aware application and to easily unit test scenarios.

Still further, by integrating database functionality within an integrated development environment, embodiments of the invention may be used to test database connectivity and functionality for a database-aware application using the same IDE interface used to create the software application. Thus, rather than having to switch between tools when developing a database-aware application, the development may rely on the single, database-aware IDE.

While the foregoing is directed to embodiments of the present invention, other and further embodiments of the invention may be devised without departing from the basic scope thereof, and the scope thereof is determined by the claims that follow.

What is claimed is:

1. A method to programmatically generate source code for a software application to connect to a database, comprising:
   responsive to receiving a selection of a database connection specifying a database and a set of connection parameters of the database connection, establishing a connection to the database;
   retrieving a data model of the database, the data model comprising a set of database elements;
   displaying the set of database elements;
   responsive to receiving a selection of a database element from the set of database elements, generating a first source code to access the selected database element, comprising:
      generating a first portion of the first source code to create a connection to selected database;
      mapping at least one host variable to a column of the selected database element;
      generating a first database statement to access the selected database element using the at least one mapped host variable; and
      embedding the first database statement in a second portion of the first source code; and
   storing the first source code within a project associated with the software application.

2. The method of claim 1, wherein the first database statement is selected from statements to create, retrieve, update, and delete records from the database, wherein the second source code is used in passing the first database statement to the database over the database connection; wherein the selection is received from a user interacting with an integrated development environment (IDE) tool to author application code; wherein the first source code is of a programming language in which the software application is being written; wherein the method further comprises outputting the first source code for display in an editing pane of the IDE tool.

3. The method of claim 2, wherein the database element is a database statement embedded as a text string within the source code of an application being developed using the IDE tool.

4. The method of claim 3, further comprising:
   storing the connection parameters as part of a development project associated with the software application being developed.

5. The method of claim 4, further comprising:
   displaying the data model in a window of the IDE tool.

6. The method of claim 5, wherein the data model is a relational schema.

7. The method of claim 6, further comprising,
   generating a unit-test application for the software application, wherein the unit test executes (i) a first test query to retrieve a set of records from the database, (ii) a second test query to retrieve a first record of the set of records, a (iii) a third test query to update the first record with sample test values, and (iv) a fourth test query to delete the first record, and (v) a fifth test query to insert the first record back into the database.

8. The method of claim 7, wherein the IDE tool provides a programming environment used to develop the software application, and wherein the IDE tool includes at least a graphical text editor and a compiler; wherein the IDE tool is configured to:
   responsive to user selection of an existing object hierarchy, generating: (i) a second one or more database statements to create a database, wherein the one or more database statements include one or more data definition language (DDL) statements, and (ii) a second source code for accessing the created database by the application code;
   responsive to user selection of a third database statement embedded in the application code, generating a third source code for accessing, by the application code, one or more database elements referenced by the third database statement;
   responsive to a user request to generate mappings between an existing database schema and an object hierarchy associated with the application code, performing at least one of generating and modifying a fourth source code for the application code to access the existing database schema via objects in the object hierarchy;
   responsive to a user request, generating code for testing at least one of the first source code, second source code, third source code, and fourth source code;
   wherein at least one of the first source code, second source code, third source code, and fourth source code is generated based on user input specifying a type of database statement to be included and whether to use objects or parameters for the generation;
   wherein the first source code, second source code, third source code, and fourth source code are generated without requiring the user to switch between the IDE tool and a second application for generating source code.

9. A computer program product comprising a computer useable storage medium having a computer readable program, wherein the computer readable program when executed on a computer causes the computer to perform an operation comprising:
   responsive to receiving a selection of a database connection specifying a database and a set of connection parameters of the database connection, establishing a connection to the database;
   retrieving a data model of the database, the data model comprising a set of database elements;
   displaying the set of database elements;
   responsive to receiving a selection of a database element from the set of database elements, generating a first source code to access the selected database element, comprising:
      generating a first portion of the first source code to create a connection to selected database;
      mapping at least one host variable to a column of the selected database element;
      generating a first database statement to access the selected database element using the at least one mapped host variable; and
      embedding the first database statement in a second portion of the first source code; and
   storing the first source code within a project associated with the software application.

10. The computer useable storage medium of claim 9, wherein the first database statement is selected from statements to create, retrieve, update, and delete records from the database, wherein the second source code is used in passing the first database statement to the database over the database connection; wherein the selection is received from a user interacting with an integrated development environment (IDE) tool to author application code; wherein the first source code is of a programming language in which the software application is being written; wherein the method further comprises outputting the first source code for display in an editing pane of the IDE tool.

11. The computer useable storage medium of claim 10, wherein the database element is a database statement embedded as a text string within the source code of an application being developed using the IDE tool.

12. The computer useable storage medium of claim 11, wherein the operation further comprises:
and
storing the connection parameters as part of a development project associated with the database-aware software application being developed.

13. The computer useable storage medium of claim 12, wherein the operation further comprises:
displaying the data model in a window of the IDE tool.

14. The computer useable storage medium of claim 13, wherein the data model is a relational schema.

15. The computer useable storage medium of claim 14, wherein the operation further comprises:
generating a unit-test application for the software application, wherein the unit test executes (i) a first test query to retrieve a set of records from the database, (ii) a second test query to retrieve a first record of the set of records, a (iii) a third test query to update the first record with sample test values, and (iv) a fourth test query to delete the first record, and (v) a fifth test query to insert the first record back into the database.

16. The computer useable storage medium of claim 15, wherein the IDE tool provides a programming environment used to develop the software application, and wherein the IDE tool includes at least a graphical text editor and a compiler; wherein the IDE tool is configured to:
responsive to user selection of an existing object hierarchy, generating: (i) a second one or more database statements to create a database, wherein the one or more database statements include one or more data definition language (DDL) statements, and (ii) a second source code for accessing the created database by the application code;
responsive to user selection of a third database statement embedded in the application code, generating a third source code for accessing, by the application code, one or more database elements referenced by the third database statement;
responsive to a user request to generate mappings between an existing database schema and an object hierarchy associated with the application code, performing at least one of generating and modifying a fourth source code for the application code to access the existing database schema via objects in the object hierarchy;
responsive to a user request, generating code for testing at least one of the first source code, second source code, third source code, and fourth source code;
wherein at least one of the first source code, second source code, third source code, and fourth source code is generated based on user input specifying a type of database statement to be included and whether to use objects or parameters for the generation;
wherein the first source code, second source code, third source code, and fourth source code are generated without requiring the user to switch between the IDE tool and a second application for generating source code.

17. A system, comprising:
a processor; and
a memory containing an integrated development environment (IDE) tool configured to generate source code for a database-aware software application by performing an operation, comprising:
responsive to receiving a selection of a database connection specifying a database and a set of connection parameters of the database connection, establishing a connection to the database;
retrieving a data model of the database, the data model comprising a set of database elements;
displaying the set of database elements;
responsive to receiving a selection of a database element from the set of database elements, generating a first source code to access the selected database element, comprising:
generating a first portion of the first source code to create a connection to selected database;
mapping at least one host variable to a column of the selected database element;
generating a first database statement to access the selected database element using the at least one mapped host variable; and
embedding the first database statement in a second portion of the first source code; and
storing the first source code within a project associated with the software application.

18. The system of claim 17, wherein the first database statement is selected from statements to create, retrieve, update, and delete records from the database, wherein the second source code is used in passing the first database statement to the database over the database connection; wherein the selection is received from a user interacting with an integrated development environment (IDE) tool to author application code; wherein the first source code is of a programming language in which the software application is being written; wherein the method further comprises outputting the first source code for display in an editing pane of the IDE tool.

19. The system of claim 18, wherein the database element is a database statement embedded as a text string within the source code of an application being developed using the IDE tool.

20. The system of claim 19, wherein the operation further comprises:
storing the connection parameters as part of a development project associated with the database-aware software application being developed.

21. The system of claim 20, wherein the operation further comprises:
displaying the data model in a window of the IDE tool.

22. The system of claim 21, wherein the data model is a relational schema.

23. The system of claim 22, wherein the operation further comprises:
generating a unit-test application for the software application, wherein the unit test executes (i) a first test query to retrieve a set of records from the database, (ii) a second test query to retrieve a first record of the set of records, a (iii) a third test query to update the first record with sample test values, and (iv) a fourth test query to delete the first record from the set of records, and (v) a fifth test query to insert the first record back into the database.

24. The system of claim 23, wherein the IDE tool provides a programming environment used to develop the software application, and wherein the IDE tool includes at least a graphical text editor and a compiler; wherein the IDE tool is configured to:
  responsive to user selection of an existing object hierarchy, generating: (i) a second one or more database statements to create a database, wherein the one or more database statements include one or more data definition language (DDL) statements, and (ii) a second source code for accessing the created database by the application code;
  responsive to user selection of a third database statement embedded in the application code, generating a third source code for accessing, by the application code, one or more database elements referenced by the third database statement;
  responsive to a user request to generate mappings between an existing database schema and an object hierarchy associated with the application code, performing at least one of generating and modifying a fourth source code for the application code to access the existing database schema via objects in the object hierarchy;
  responsive to a user request, generating code for testing at least one of the first source code, second source code, third source code, and fourth source code;
  wherein at least one of the first source code, second source code, third source code, and fourth source code is generated based on user input specifying a type of database statement to be included and whether to use objects or parameters for the generation;
  wherein the first source code, second source code, third source code, and fourth source code are generated without requiring the user to switch between the IDE tool and a second application for generating source code.

* * * * *